Oct. 7, 1941.　　　　W. E. BLAKE　　　　2,257,779
MONOTYPE MOLD BLADE LUBRICATOR
Filed Nov. 14, 1940　　　　3 Sheets-Sheet 1

Inventor
WILLIAM E. BLAKE
By Thomas W. J. Clark
Attorney

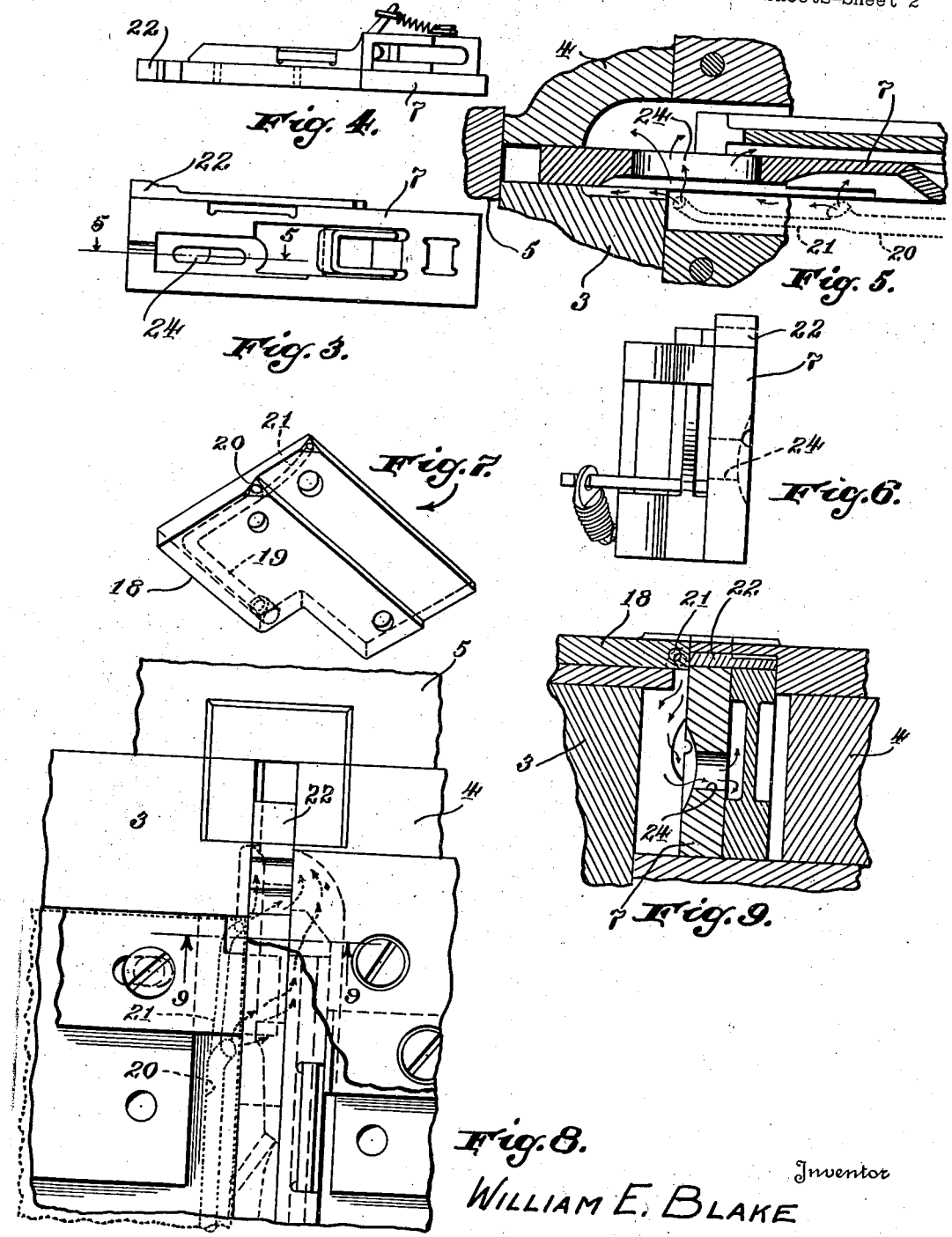

Patented Oct. 7, 1941

2,257,779

UNITED STATES PATENT OFFICE 2,257,779

MONOTYPE MOLD BLADE LUBRICATOR

William E. Blake, Baltimore County, Md., assignor of one-half to Waverly Press, Inc., a corporation of Maryland Application November 14, 1940, Serial No. 365,699

9 Claims. (Cl. 199—84)

This invention relates to the lubrication of the mold blade of a type mold such as that shown in the patent to Knight, No. 1,219,956, March 20, 1917, which is the type generally used on a Lanston monotype machine.

In the use of these molds, type metal is forced up from below by a pump at a temperature from 750° to 800° F. and in the mold it is cast into the form of a type. In consequence the mold gets very hot. The parts of the mold coming in contact with the hot metal are made of hardened steel and machined to an accuracy of one ten thousandth of an inch. The stationary parts are fixed to a base and the movable parts move in grooves or channels formed between parts likewise fixed to the base so that the whole type mold may be removed bodily from the monotype machine for adjustment or repair.

Water circulating openings have been placed in the various blocks forming the mold in an effort to cool it and to maintain the parts in better working order. The cross-block forming one side of the mold cavity has been lubricated to prevent it from sticking but up to the present time the mold blade has not been adequately lubricated with the consequence that several times a day, due to the heat caused by the presence of the hot metal, the blade sometimes sticks, becomes nicked, often becomes blackened, and causes the type metal to stick to it and at times causes fins or burrs and other irregularities on the type. This necessitates the removing of the block from the machine and cleaning the blade, and sometimes, its repair or replacement.

The mold blade is so delicate in its adjustment, its tolerances are so small, that it is necessary to send the whole block back to the manufacturer for repair upon any accident happening to the blade which makes the casting of the type in any respect irregular and it sometimes delays the production of the machine for quite a period. Even the stopping of the machine for the purpose of cleaning the mold blade delays the production of the machine and since the machines are quite expensive this cleaning raises the cost on the work being done.

The object of this invention is to lubricate the mold blade and to lubricate it so accurately with precisely the required amount of lubricant that there is no sticking of the blade and substantially no nicking or overheating of the blade. Too much lubricant is as bad for the blade and its proper operation as too little. Another object of the invention is to regulate the amount of lubricant supplied to such a fine degree of accuracy that the blade will have the amount of lubricant required for its operation. Another object of the invention is to maintain the quantity of the lubricant flowing constant, because continuous burning or sticking of the type would occur, or smearing over of the type, owing to the adhesion of lubricant, even if there were a small variation in the quantity of the lubricant.

According to the invention, lubricant is taken from a well lubricating one side of the cross-block and the amount removed is so infinitesimal that substantially no more lubricant is required for properly lubricating the reciprocatory members of the type mold than has heretofore been required. The lubricant is taken from this supply by means of a vacuum pump operated by the air pressure line controlling the other operations of the machine and by this vacuum pump the lubricant is forced through passages leading to each side of the mold blade either through cover blocks placed on the present type molds or through the fixed mold blocks.

Periodic impulses are supplied to the vacuum pump by any of the operating parts of the machine so that only a small portion of lubricant is fed at regular intervals. A valve is placed in the air pressure line to regulate the amount of air supplied to the vacuum pump.

Where the lubricant is drawn by the vacuum pump from the lubricant supply pipe it is caught up by the air under pressure and atomized into small particles and in this condition blown upon the sides of the mold blade and its channel thus providing an atomized lubrication of the blade on both sides with an exact amount of lubrication at exact intervals.

Apparatus involving the invention is shown in the accompanying drawings forming a part hereof and in which smiilar numerals represent similar parts throughout the several views.

In the drawings:

Figure 3 is a side elevational view of the mold blade.

Figure 4 is a top plan view thereof.

Figure 5 is a longitudinal sectional view of the mold blade on line 5—5 of Fig. 3 showing its position in the type mold.

Figure 6 is a view of the forward end of the mold blade.

Figure 7 is an inverted perspective view of the cover block showing lubricant passages.

Figure 8 is an enlarged partial top plan view showing the lubricant passages and the course of the lubricant around the blade.

Figure 9 is a vertical sectional view on line 9—9 of Fig. 8.

Figure 1:
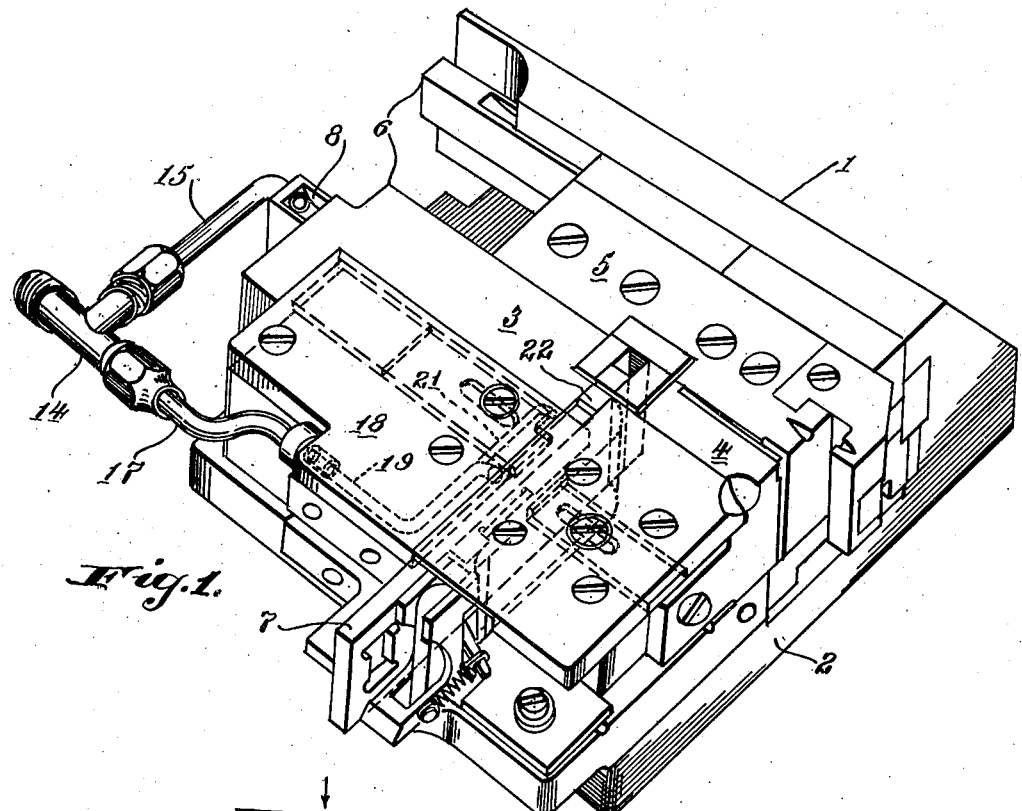
Figure 1 is a perspective view of a type mold embodying the invention.
Figure 2:
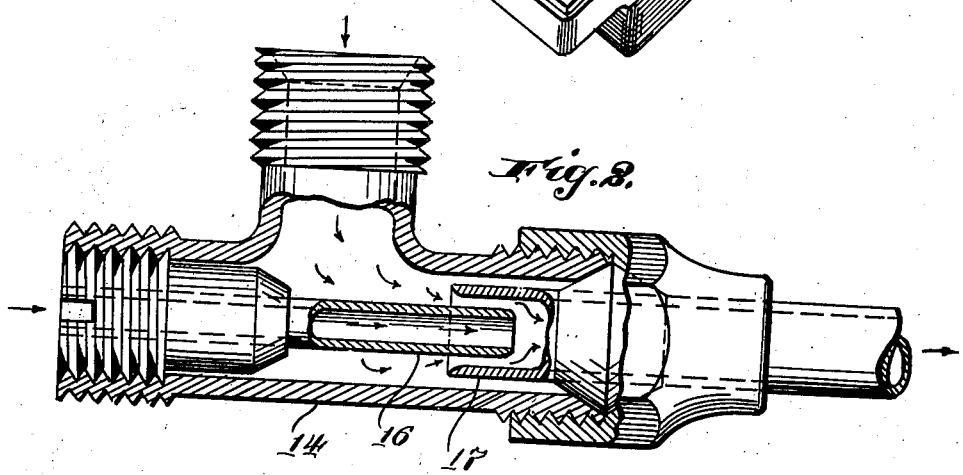
Figure 2 is a partial sectional view of the vacuum pump supplying oil to the blade.

The mold 1 has base 2 and blocks 3 and 4 forming two sides of the mold cavity and with a cross-block 5 operating in channel 6 forming another side of the cavity and mold blade 7 operating between the blocks 3 and 4 forms the fourth and remaining side of the cavity. The mold as thus formed is adapted to be placed in the monotype machine with the mold cavity immediately over the conical orifice of the type metal supply. The type metal is forced from the orifice by a pump and by other mechanism not shown and not forming a part of this invention. The mold block 5 reciprocates in its channel 6 and has lubricant on each side, the oil reservoir or well on one side being shown at 8.

All machines of this type operate with compressed air to cast the proper type as indicated by the perforated sheet which is previously punched at the proper places to indicate the desired letters required to make up each line of type. This compressed air system likewise controls the timing mechanism of the other elements of the machine. These machines have a galley cam shown at 9 in Fig. 10, the complete function of which may be seen by reference to the patent to Bancroft, No. 625,998 dated May 30, 1899. This cam rotates one revolution upon the formation of each line of type and for the purpose of the present invention the projecting cam 10 thereon is used to intermittently depress the compressed air line valve 11, the compressed air line being shown at 12. It will be apparent that any other operating part of the machine which operates only when the mold blade is in operation could be used with equal facility for operating the valve 11 periodically.

From the line 12 through the valve 11 the compressed air goes through the needle adjusting valve 13 which accurately controls the amount of air periodically supplied, only when the blade is operated, to the vacuum pump 14.

The oil well 8 has a pipe 15 leading from adjacent the bottom thereof through which oil is drawn to vacuum pump 14. The pump 14 has the small air nozzle 16 placed in the entrance to the larger open pipe 17 and with each blast of air exiting from the nozzle 16 oil is drawn from the well 8 through pipe 15 into the pipe 17 in atomized form, it being a mixture of oil and air that travels, by pressure, through the pipe 17.

In the modification shown in Fig. 1 a cover block 18 is rigidly attached by screws to other blocks attached to the base 2 of the mold. This cover block 18 has lubricating passage 19 therein, to which the pipe 17 is connected. This passage 19 has two branches 20 and 21 which discharge oil in very fine particles, being atomized, against the top section 22 of the mold blade 7. This top section reciprocates with the bottom or main section of the mold blade except when low quad type are to be made. The orifice of branch 20 discharges the lubricant toward the longitudinal center of the blade and the orifice leading from branch 21 discharges the lubricant adjacent the forward end of the blade. An opening 24 passes transversely through the body of the blade and allows the lubricant to pass therethrough in order to lubricate the other side of the blade.

Figure 10:
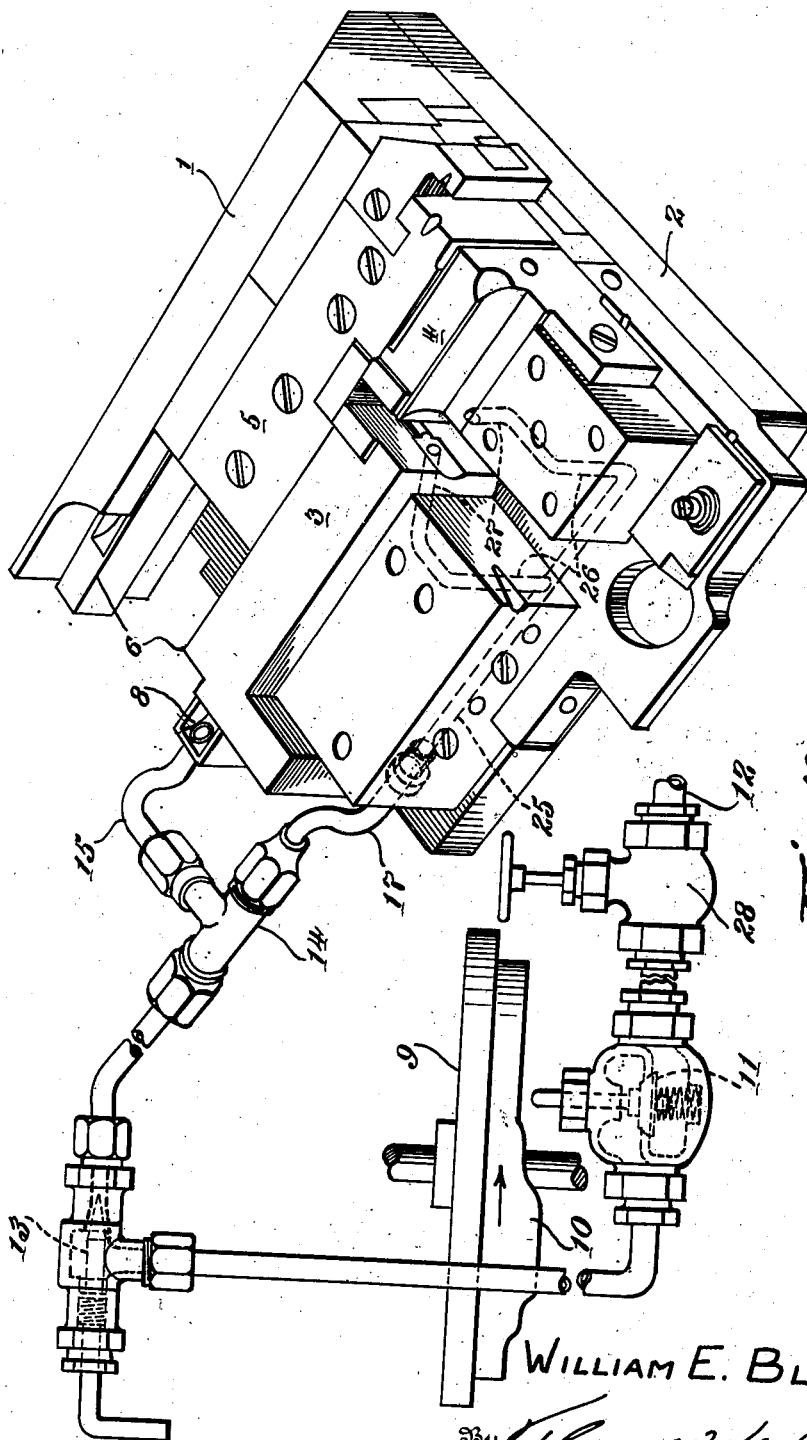
Figure 10 is a perspective view of the type mold showing a modification of the lubricant passages and showing in schematic form the lubricant feeding means.

If it be preferred passage 25 may be cut in the base 2 of the mold and from this passage branches 26 may be drilled in the blocks leading to the blade channel and these passages as shown at 27 preferably terminate at an acute angle to the channel so that the oil atomized in the air will be sprayed forward toward the mold blade face as it is forced from the passage. Pipe 17 is connected to communicate with passage 25 in this form. This construction is shown in Figure 10 of the drawings.

When the mold block is not in operation, and should the rest of the machine be, or if for any other reason it is desired to cut off the flow of oil to the mold blade channel, valve 28 is provided for that purpose. The needle valve 13 may be set to emit precisely the right amount of air to draw the right amount of oil from the reservoir 8 and to force it through the passages to the mold blade. It is noted and it is preferable that the exits to the passages carrying the atomized oil be slightly removed from the blade as shown in Figure 7 and as shown on one side in Figure 10, so that the atomized oil may be slightly spread before contacting the blade.

With the use of the lubricating device above described it has been found in practice that the machine may be run from 10 to 20 percent faster than without this lubricating device, which makes a considerable saving throughout a year's operation of these machines.

Also it is not necessary to send the type mold back to the factory for repair and adjustment because of blade trouble. There is substantially no more blade trouble when it is adequately lubricated by the device of this invention. Factory repair is now only required when the parts actually wear and it is necessary to restore the mold to type height.

Although the mold still gets hot because of the type metal injected into it, that heat no longer causes the sticking or the nicking or the blackening of the mold blade, all of which heretofore have caused so much delay, repairs and other troubles with the operation of the blade.

What is claimed as new and is desired to be secured by Letters Patent is:

1. In combination with a monotype casting machine having a compressed air controlling system, a type mold including a mold blade reciprocable in the mold, to size and eject the type, and means including said compressed air system, to feed oil periodically to both sides of said blade.

2. A type mold embodying blocks and a reciprocating blade said blade and certain of said blocks forming a mold cavity, certain of said blocks forming a channel for said blade, a lubrication passage in certain of said blocks leading to said channel and blade, and means to feed lubricant therethrough to said blade.

3. A type mold embodying a base, blocks and a reciprocating blade said blade and certain of said blocks forming a mold cavity, certain of said blocks forming a channel for said blade, lubricating passages in said base and certain of said blocks leading to said channel and means to feed lubricant therethrough to said blade.

4. A type mold embodying blocks and a reciprocating blade said blade and certain of said blocks forming a mold cavity, certain of said blocks forming a channel for said blade, a lubrication passage in certain of said blocks leading to said channel, said blade having an opening therein in position to allow the passage of lubricant therethrough, and means to feed lubricant through said passage and opening to lubricate both sides of said blade.

5. A type mold embodying a reciprocable mold blade and blocks, the blade end and certain of the blocks forming a mold cavity, certain of the blocks forming a channel for the blade and having therein internal passages opening adjacent the forward end of the blade for the admission of lubricant to the blade and means to periodically supply lubricant to said passages.

6. A type mold embodying a cross-block, a mold blade and fixed blocks forming a channel for said mold blade, said blocks and blade forming the walls of a mold cavity, lubricating means for one side of said cross-block, and a passage leading therefrom to said channel to lubricate said blade.

7. A type mold embodying a reciprocable mold blade and blocks forming a channel therefor, said blocks and blade forming a mold cavity, said mold having a passage therein admitting a lubricant to said blade, and means to feed a lubricant through said passage periodically and in closely regulable amounts.

8. Mold blade lubricating means comprising, a type mold having a mold blade and blocks forming a channel therefor, lubrication passages communicating with said channel, a vacuum pump connected to said lubrication passages, and an oil supply leading to said pump, a compressed air line also leading to said vacuum pump and drawing oil from said supply and feeding the same to said passages, a valve in said compressed air line to vary the suction of said pump and thereby to vary the oil supplied to said blade.

9. In combination with a monotype casting machine having a compressed air controlling system, a type mold including a mold blade reciprocable in the mold, to size and eject the type, operating mechanism for said machine including a part movable in a predetermined path which is moved in that path when the blade is reciprocated, and means including said compressed air system, to feed oil to said blade, said means being intermittently operated by said movable machine part.

WILLIAM E. BLAKE.